MAGNETIC CORE BUFFER STORAGE

Filed Feb. 17, 1966 3 Sheets-Sheet 1

INVENTOR
FRANK FANG TSUI

BY [signature]
ATTORNEY

MAGNETIC CORE BUFFER STORAGE

Filed Feb. 17, 1966 3 Sheets-Sheet 2

INVENTOR
FRANK FANG TSUI
BY [signature]
ATTORNEY

INVENTOR
FRANK FANG TSUI

BY [signature]
ATTORNEY

United States Patent Office 3,457,555

Patented July 22, 1969

3,457,555

MAGNETIC CORE BUFFER STORAGE

Frank Fang Tsui, Boblingen, Germany, assignor to International Standard Electric Corporation, New York, N.Y., a corporation of Delaware Filed Feb. 17, 1966, Ser. No. 528,111
Claims priority, application Germany, Feb. 20, 1965, St 23,399; Dec. 22, 1965, St 24,797
Int. Cl. G11c 5/02, 11/22
U.S. Cl. 340—174 5 Claims The invention relates to a magnetic core buffer storage, consisting of storage matrices which may be used, for example, for speed adaptation between a computer and the input/output devices in electronic computer systems, or as a storage for measuring values to be used in satellites.

In the known "bit-organized" ferrite core storages with random access (so-called working storages) the current coincidence principle is applied when selecting one or several storage elements, i.e. each storage element possesses two selection wires, viz. a row wire and a column wire, and through coinciding semi-current pulses the magnetic condition of the storage elements can be changed. Those core storages are generally operated in two immediately consecutive time positions. During the first time position the storage element is read out and during the second time position the former information or a new information is written into the storage element. For such ferrite core storages with random access bipolar current pulses are required for the coincidence operation. One polarity is used for reading-out and the other polarity for writing-in. Also in the known so-called "word-organized" ferrite core storages bipolar pulses are used for read-write selection.

Ferrite core storages were also used as buffer storages ("Elektronische Rechenanlagen," 1960, No. 1, pp. 16–22; German printed application 1,174,363). With those and other known buffer storages the information is inserted into the storage cells with the bits in parallel and the words in series and the information is generally read out only then, when the entire storage has been filled. The individual storage cells are read out always just once and need not to be read out several times as in normal magnetic core storages. Also it is not necessary that the information can be rewritten immediately after reading. With magnetic core buffer storages only the high speed and the independance from a fixed clock pulse program is required and not the random access and the changeability of the cell contents individually, offered by the normal type core storage.

The above mentioned known magnetic core buffer storages are operated like normal magnetic core storages. Particularly current pulses of both polarities are required to operate the column wires and the row wires. Therefore the known ferrite core buffer storages do not differ substantially in expenditure from normal ferrite core storages.

With the new mode of operation of the magnetic core buffer storage described below the expenditure of the storage is considerably reduced in that for the row wires and the column wires only current pulses of one polarity are required.

The invention is based on a magnetic core buffer storage operating on the current coincidence principle, said storage being formed of one or several storage matrices with column- and row-wires, connectable to drivers via selecting switches, as well as reading amplifiers whereto reading wires are connected and with inhibit wires, connected to inhibit drivers.

The invention is characterized in this, that the column wires and the row wires are operated with semi-current pulses of one polarity only and the inhibit drivers render semi- or full-current pulses of only one polarity, and that, prior to a writing-in process, all cores of the storage are brought into the "1" condition through a full-current pulse, applied to the inhibit wire in one direction (preparatory phase), and that for writing-in the cores are successively actuated in an arbitrary sequence always with a semi-current pulse to the row- and column-wires in the other direction whereby during the writing-in of a "0" said semi-current pulses effect coincidently that the core switches into the "0"-condition, and when writing-in of a "1" said switching is prevented by a semi-current pulse to the inhibit wire simultaneously with said semi-current pulses, but effective in the opposite sense so that the core remains in the "1"-condition (writing-in phase) and that, for reading-out, the cores are actuated in a way known per se successively and in a random sequence with always one semi-current pulse of the same polarity as in the writing-in phase in coincidence on the row- and column-wire (reading-out phase).

It is one object of the present invention to utilize the multiplicity in the X- or Y-switch stages, which anyway exists for circuit-technical reasons, in order to simplify the buffer storage.

The magnetic core buffer storage according to one embodiment of the present invention is characterised by the fact that the column- and row-wires are operated with semi-current pulses of only one, the first polarity, and that the Z-drivers likewise only provide full-current pulses of only one, but of the second polarity, and that prior to a writing process, all cores of the storage, by the action of a full-current pulse of the second polarity applied to the Z-wires, are brought into the "1"-condition (pre-writing phase), and that for the writing, the cores are successively selected in any arbitrary order of succession, in such a way that upon writing a "0," semi-current pulses of the first polarity will appear in coincidence on the row- or column-wire, for effecting that the core is changed into the "0"-condition, and that upon writing of a "1," a semi-current pulse of the first polarity will only appear on the row- or column-wire, thus effecting that the core will remain in the "1"-condition (writing phase), and that for effecting the reading, the cores, in the manner known per se, are selected successively in any arbitrary order of succession with each time one semi-current pulse of the first polarity being applied to the row- and the column-wire in coincidence (reading phase).

The invention is now explained in detail with the aid of the accompanying drawings, wherein.

Figure 1:
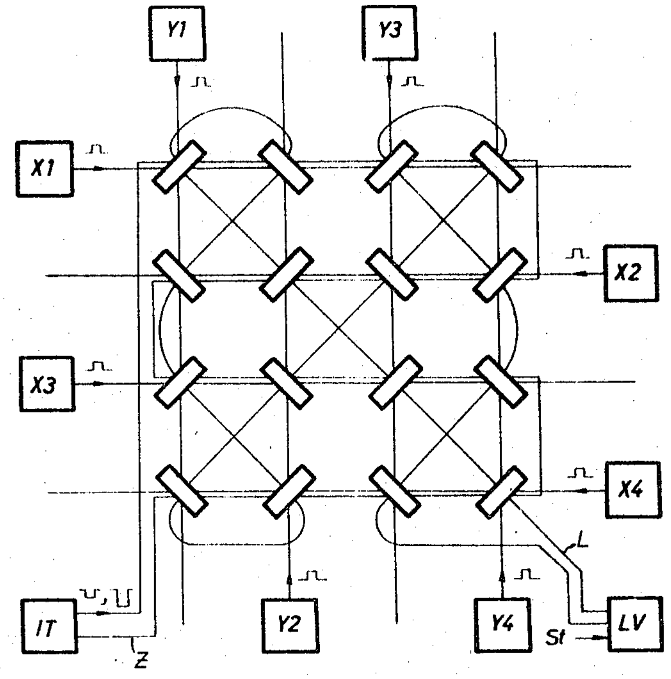
FIG. 1 shows a storage matrix of the magnetic core buffer storage and its actuation.

FIG. 1 shows a storage matrix of the magnetic core buffer storage according to the invention with its control means which arrangement does not essentially differ from the magnetic core storage known to the art. For simplification it is assumed that the matrix has only 4 rows and 4 columns, i.e. in total 16 storage cores. Through each storage core pass a row wire and a column wire as well as a reading wire L and a inhibit wire Z. Each row wire is connected with a row current pulse generator X and each column wire with a column pulse generator Y. The current pulse generators can be either the actual drivers or diodes, operated by drivers, or even the output windings of a diode transformer matrix, operated by drivers. The reading amplifier LV is connected to the reading loop which is operated also with strobing pulses St, except for the reading-out signals. The inhibit driver IT is connected to the inhibit wire Z.

In the magnetic core storages known the row drivers and the column drivers furnish semi-current pulses of one polarity during writing-in, and during reading-out semi-current pulses of the opposite polarity and the inhibit driver furnishes only semi-current pulses of the latter polarity, and only at writing-in a "0," so that switching of the selected core to the remanent condition "1" under the effect of the row- and column-writing pulses is prevented. The arrangement according to FIG. 1 differs in that all row- and column-current pulse generators furnish only semi-current pulses of one polarity and the inhibit driver furnishes semi- and full-current pulses. With this arrangement the row- and column-current pulse generators can be made cheaper at a moderately increased expenditure in inhibited drivers.

Figure 2:
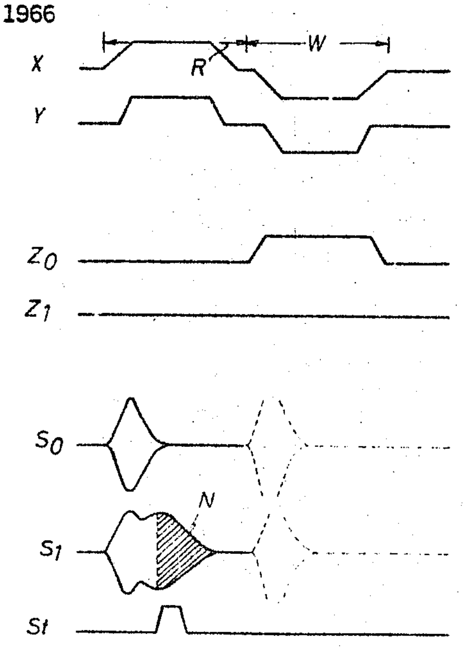
Fig. 2 PRIOR ART
FIG. 2 shows a pulse diagram of the known ferrite core storage.
Figure 3:
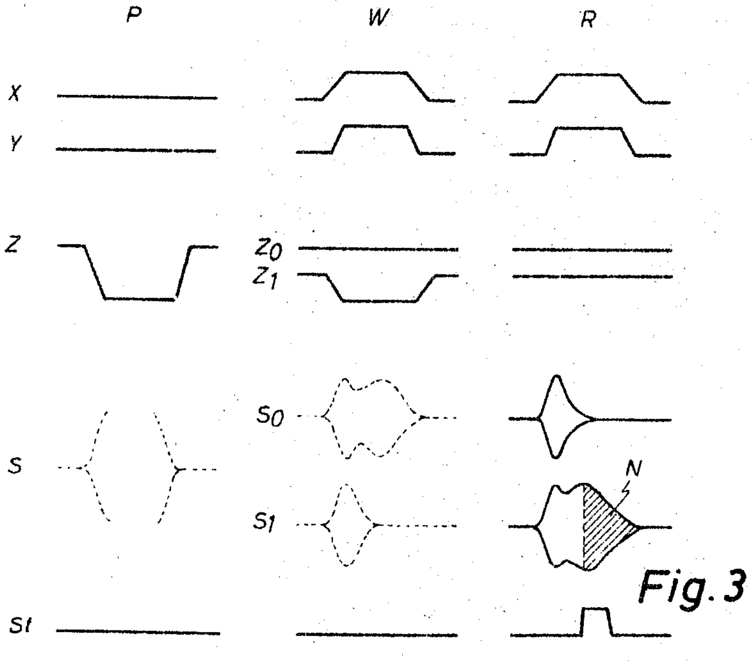
FIG. 3 shows a pulse diagram of a magnetic core buffer storage according to the invention.

FIG. 2 shows a pulse diagram for the just described conventional magnetic core storage and FIG. 3 shows a pulse diagram for the magnetic core buffer storage according to the invention. The references for the voltages and currents as well as for writing and reading are the same in both figures. The reading is designated R and the writing W. The two top mentioned curves designated X and Y in FIG. 2 are the coincidence semi-current pulses occurring on the row and column leads, respectively. It is clearly shown that the writing process immediately follows the reading. The two following pulse trains, designated $Z_0$ and $Z_1$ are the current pulses which occur on the inhibit wire Z in case of the "0"- or the "1"-writing, respectively. From this pulse train it may be gathered that a positive semi-current pulse appears only when storing a "0," whereas when storing a "1" no inhibit pulse occurs. The final three pulse trains of FIG. 2 show the reading voltage when reading a "0," designated $S_0$ and the reading voltage by reading a "1," designated $S_1$, respectively, and the strobing pulse St which reaches the input of the reading amplifier LV in the indicated time position.

The mode of operation of the magnetic core buffer storage essentially differs from the mode of operation of the known magnetic core storage and can be clearly seen in FIG. 3. The magnetic core buffer storage is operated in three phases: in a preparatory phase P, in a writing phase W and in a reading phase R. The pulse trains are not shown continuously, in contrast to FIG. 2, in order thus to indicate that the individual processes do not follow each other immediately, but after the preparatory phase P the writing process W is generally repeated until the storage is completely filled. The same applies to the reading process, until the stored data are read out.

In the preparatory phase all cores of the storage are brought into the condition, corresponding to the binary "1" by a full-current pulse, applied to the inhibit winding. In the known magnetic core storages the cores are in the "0"-condition prior to writing-in (immediately after the reading-out), (see FIG. 2).

During the writing phase at the buffer storage according to the invention the cores of the matrix are written-in successively in a random sequence. The coincidence current pulses on the leads X and Y thereby have such a polarity that they would switch the cores of the selected cell from the condition "1" into the condition "0" without any further measures. When writing a "0" no current pulse $Z_0$ appears on the inhibit wire and the corresponding core is actually switched from the condition "1" into condition "0." When writing a "1" this switching of the core into the condition "0" is prevented by an inhibit pulse opposing the coincidence current pulses $Z_1 = -I_m/2$ at $X = +I_m/2$ and $Y = +I_m/2$. Therefore the core remains in the condition "1." It is pointed out here again that the polarity and the affiliation of the inhibit pulse to the information is contrary to that known for the conventional core storages.

During the reading phase in the buffer storage according to the invention the storage cells are read successively in a random sequence. The coincidence current pulses on the line- and column-wires X and Y, respectively, have such a polarity that the core of the selected cell switches from the condition "1" (if they are in said condition) into the condition "0." During the read-out phase no inhibit pulses occur. The cores, being already in the "0"-condition cannot switch any more during the reading, whereas the cores which were in the "1"-condition during writing, due to the inhibit pulse, switch during the reading, and render the output signals. The evaluation is made by means of the strobing pulse St as in the conventional core storages.

As already described above all cores of the store, during the preparatory phase, are changed from the condition "0" to the condition "1" by full-current pulses applied to the inhibit wire. These full-current pulses can also be furnished by the inhibit driver, which furnishes the required semi-current pulses when writing a "1." For the sake of clarity in his case too, the term "inhibit driver" is used, although the full-current pulse does not serve the inhibition during the preparatory phase. The inhibit driver, during the preparatory phase, should render a current with an amplitude of at least $-I_m$ (that is twice the amplitude of the normal inhibit pulse). This can be achieved with a minor change of the normal inhibit driver in that it is operated with normal supply voltage to produce the semi-current pulses and with twice the supply voltage for producing the full-current pulses.

Figure 4:
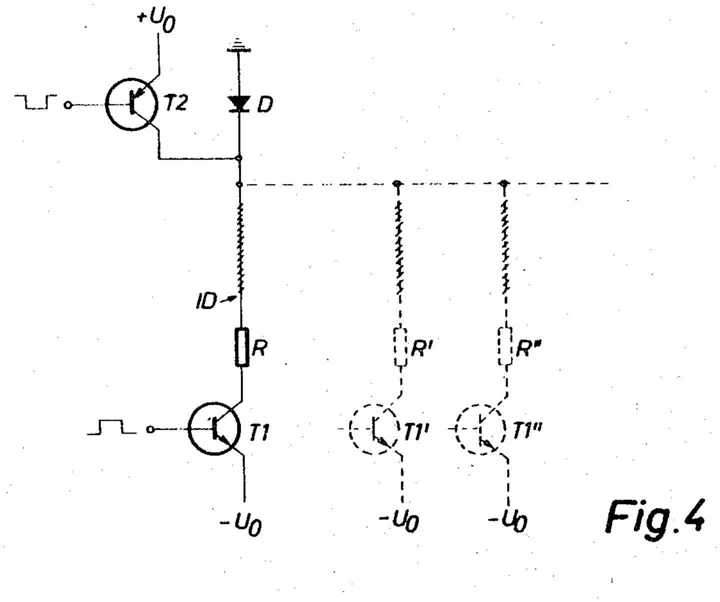
FIG. 4 shows a circuit arrangement to produce the inhibit semi- and full-current pulses.

FIG. 4 shows an example of the inhibit driver for the magnetic core buffer storage according to the invention. It consists of an electronic switch T1, series-connected with the inhibit wire ID and a current determining resistor R, and a combination of a diode D and a second electronic switch T2. The first switch (the actual inhibit driver, shown in the example as an npn-type transistor) is connected to the voltage source (in the example $-U_o$), and the second switch (pnp-type transistor) to a second voltage source of opposite polarity ($+U_o$), while the anode of the diode is grounded.

For operation with semi-current pulses only the first switch is conducting and a current flows via the diode through the inhibit wire with the amplitude $U_o/(R+R_D)$ whereby $R_D \ll R$. For operation with full-current pulses both transistors are conductive simultaneously. The diode is blocked and a current flows through the inhibit wire now with an amplitude of $2U_o/R$. As indicated in FIG. 4 the combination $T_2$, D can also be used for several inhibit drivers switched in parallel as far as the current capacity permits. In a storage of larger capacity in which many inhibit drivers must be provided they can also be made conductive in groups successively (instead of all simultaneously) during the preparatory phase, in order to avoid an excessive load on the voltage source $+U_o$ or on the switch T2.

The new mode of operation can also be applied to magnetic core buffer storages being word-organized and wherein no current coincidence is used for selecting the address. In this case the circuit is arranged thus that the drivers for the word wires furnish full-current pulses of only one polarity, and the bit-drivers furnish semi- and full-current pulses also with one polarity and that, prior to the writing process, all storage cores are brought into a preparatory phase in the "1"-condition through full-current pulses applied to the bit-wires, and that for writing a "0" said cores are switched by full-current pulses on a word-wire into the "0"-condition, while for writing a "1" said switching is prevented by a semi-current pulse simultaneously applied to the bit-wire.

In another embodiment of the invention the properties of the row- and column-current pulse generators are the same as in the arrangement described above. The inhibition (Z) driver, however, in this embodiment now only provides full-current pulses.

Figure 5:
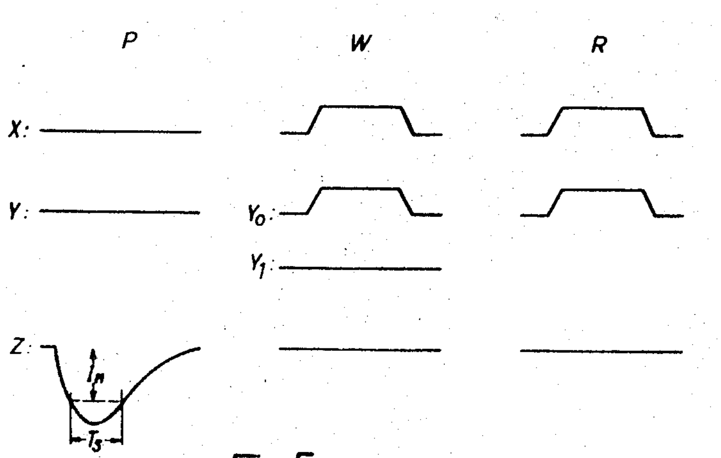
FIG. 5 shows a pulse diagram of another embodiment of a magnetic core buffer storage according to the invention.

FIG. 5 shows a pulse diagram of this other embodiment. The store is also operated in three phases. During the pre-writing phase P (preparatory phase), all cores of the store are brought into the condition or state corresponding to the binary "1," by the action of a full-current pulse applied to the Z-winding. During this process no pulses appear on the row- and column-wires (leads).

During the writing phase W, writing is effected into the individual cores of the matrix successively in an arbitrary order of sequence. During the writing of a "1" a semi-current pulse is only applied to the X-wire, whereas the Y-wire remains without current at this time position (Y1 in FIG. 5). In this way it is accomplished that the core is prevented from switching, and is retained in the "1"-condition. For the writing of a "0," however, coincidence current pulses of $+I_m/2$ are applied to both the row and the column wires, so that the core is caused to change from the "1"- into the "0"-condition. Hence, it will be seen that during the writing phase, the current pulses are controlled separately in one of the dimensions of the coincidence selection (in the example in the Y-direction), i.e. separately with respect to the different bit planes, that is, in dependence upon the binary value to be stored, of the individual bit positions with the amplitude 0 for writing the "1," and $+I_m/2$ for writing the "0."

During the reading phase R the storage cells are (successively) read in an arbitrary order of succession. The coincidence current pulses, as applied to the row- and column-wires X or Y, respectively, have such a polarity that the cores of the selected cell are changed from the condition "1" (provided that they are in this condition) into the condition "0." No inhibition (Z—) pulses appear during the reading phase. The cores which are already in the "0"-condition, are no longer capable of being reversed during the reading, whereas the cores which, during the writing, and due to the selection or control employed during this process, were retained in the "1"-condition, are changed into the respective other condition during the reading, and will transmit intelligence signals. Similarly, as with the conventional type of core storage, the evaluation is performed during the strobing pulse S*t*.

Unlike in the first-mentioned embodiment, the current pulses in the Z-windings are no longer required for the writing process. The switch stages for the Z-pulses need now no longer be controlled individually and may therefore be assembled at will. Among the silicon controlled rectifiers there are such ones which, for example, are capable of supplying surge currents of several 100 amperes. The great number of Z-drivers, the individual controlling of which was still necessary when performing the operation with the aid of inhibition pulses, may now be replaced by a small number of silicon controlled rectifiers so that (especially in the case of large storage capacities) it is possible to achieve considerable savings as regards the expenditure on circuitry, resulting in a reduction of both weight and space.

Figure 6:
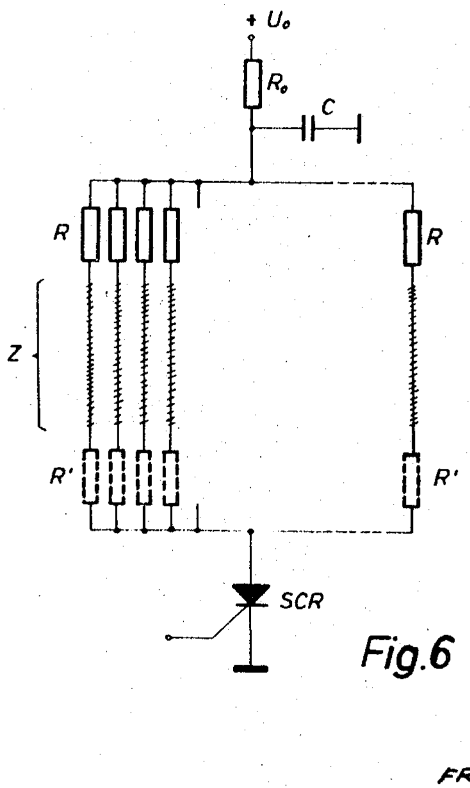
FIG. 6 shows a circuit arrangement for selecting the Z-windings.

FIG. 6 shows a possibility for selecting the Z-wires which are all connected in parallel. SCR indicates the silicon controlled rectifier. R and R′ only serve to reduce the effects of stray capacitance among the various bit planes. If so required, R′ may also be omitted. The parameters shall be chosen thus that the Z-pulse, as applied to individual wires, at least for a time duration $\geqq T_s$ (with $T_s$ being the switching time for the cores of the entire row) has an amplitude $\geqq I_m$, in order that the complete resetting of the cores is safeguarded during the pre-writing phase (FIG. 5).

What I claim is:

1. A magnetic core buffer storage operating on the current coincidence principle and consisting of one or several storage matrices with column- and row-wires, connectable to drivers via selecting switches, and with reading wires, connected to reading amplifiers, and inhibit wires, connected to inhibit drivers, characterized in this that the column- and row-wires are operated with semi-current pulses of one polarity only and the inhibit drivers furnish semi- or full-current pulses of one polarity only, and that prior to each writing process or cores of the storage are brought into the "1"-condition (preparatory phase) through a full-current pulse applied on the inhibit winding in one direction, and that for writing-in the cores are successively and in a random sequence actuated with a semi-current pulse applied onto the row- and column-wire in the other direction, whereby during writing-in of a "0" said semi-current pulses effect in coincidence that the core triggers into the "0"-condition, and when writing-in a "1" said triggering is prevented by a semi-current pulse applied on the inhibit line simultaneously with these semi-current pulses, but effective in the opposite sense, so that the core remains in the "1"-condition (writing phase), and that for reading-out the cores are actuated in coincidence, successively and in a random sequence with each a semi-current pulse of the same polarity as in the writing phase on row- and column-wires (reading phase) and that an electronic switch (T1) is series-connected in the inhibit wire (ID) with a current-defining resistor (R) and a combination consisting of a diode (D) and a second electronic switch (T2), such that for producing a semi-current pulse only the first electronic switch (T1) is made conductive, and that for producing the full-current pulse both switches (T1 and T2) are made conductive.

2. An arrangement to produce the full-current or semi-current pulses in the inhibit wire according to claim 1, characterized in this that the inhibit driver operates in the preparatory phase with a supply voltage twice as large as in the writing phase.

3. An arrangement according to claim 2, characterized in this that the inhibit wires in the store are switched on in groups successively during the preparatory phase.

4. A magnetic core buffer storage, being word-organized and using no current coincidence for selecting the address, characterized in this that the drivers for the word wires supply full-current pulses of one polarity, and the bit-drivers and semi- and full-current pulses of also one polarity, that prior to the writing all storage cores are brought in a preparatory phase in the "1"-condition by full-current pulses, applied to the bit-wires, and that for writing a "0" the cores are switched into the "0" condition by a full-current pulse applied to the word wire, while for writing a "1" said switching is prevented by a semi-current pulse simultaneously applied to the bit-wire.

5. A magnetic core buffer storage using coincident currents for reading, and which is composed of one or more storage matrices, with column- and row-wires connectable to the driver via selecting switches, with reading wires connected to reading amplifiers and with inhibit wires connected to inhibit drivers, characterized in this that the column- and row-wires are operated with semi-current pulses of only one first polarity, and that the Z-drivers likewise only provide full-current pulses of only one, but of the second polarity, and that prior to a writing process, all cores of the storage, by the action of a full-current pulse of the second polarity applied to the Z-wires, are brought into the "1"-condition (pre-writing phase), and that for the writing, the cores are successively controlled in any arbitrary order of succession, in such a way that upon writing a "0," semi-current pulses of the first polarity will appear in coincidence on the row- or column-wire, for effecting that the core is changed into the "0"-condition, and that upon writing of a "1," a semi-current pulse of the first polarity will only appear on the row- or column-wire, thus effecting that the core will remain in the "1"-condition (writing phase), and that for effecting the reading, the cores are controlled successively in any arbitrary order of succession with each time one semi-current pulse of the first polarity being applied to the row- and the column-wire coincidence (reading phase), and that each of the Z-wires includes a current defining resistor (R) and the combination is all connected in parallel such that the inhibit (Z—) full-current pulses for all planes of a storage are produced by one or more series connected silicon-controlled rectifiers (SCR).

References Cited

UNITED STATES PATENTS

| | | | |
|---|---|---|---|
| 2,734,184 | 2/1956 | Rajchman | 340—166 |
| 2,902,677 | 9/1959 | Counihan | 340—174 |

JAMES W. MOFFITT, Primary Examiner

U.S. Cl. X.R.

307—252